J. BARKER.

Assignor, by mesne assignments, to L. HILL, A. L. & T. H. BROWN.

Middlings-Separators.

No. 8,528. Reissued Dec. 17, 1878.

Witnesses:

Wm. Blacklock

Melville Church

Inventor:

Joseph Barker

By L. Hill

Atty.

N. PETERS, PHOTO-LITHOGRAPHER, WASHINGTON, D. C.

UNITED STATES PATENT OFFICE.

JOSEPH BARKER, OF CHICAGO, ILLINOIS, ASSIGNOR, BY MESNE ASSIGNMENTS, TO LYSANDER HILL, A. L. BROWN, AND THOMAS H. BROWN.

IMPROVEMENT IN MIDDLINGS-SEPARATORS.

Specification forming part of Letters Patent No. 97,341, dated November 30, 1869; antedated November 17, 1869; Reissue No. 8,528, dated December 17, 1878; application filed November 14, 1878.

*To all whom it may concern:*

Be it known that I, JOSEPH BARKER, of Chicago, in the county of Cook and State of Illinois, have invented an Improved Middlings-Separator; and I do hereby declare that the following is a full, clear, and exact description thereof, which will enable others skilled in the art to make and use the same, reference being had to the accompanying drawings, and letters marked thereon, making a part of this specification, in which—

Figure 1:
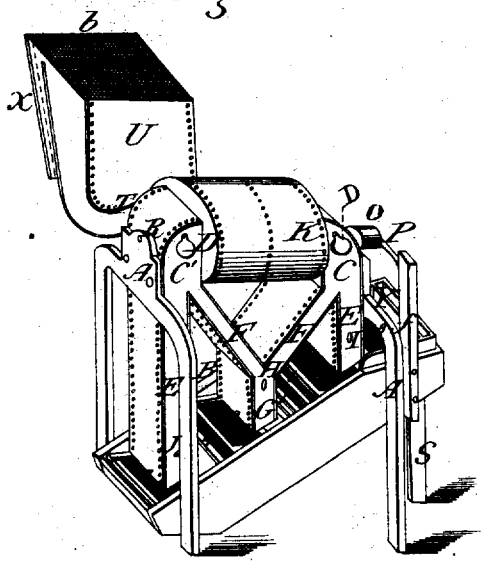
Figure 2:
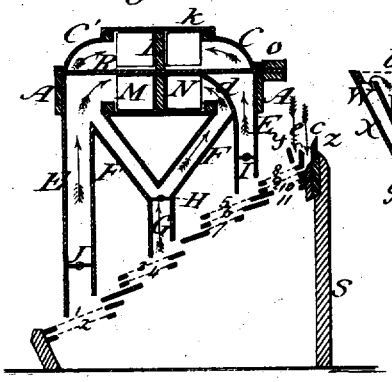
Figure 3:
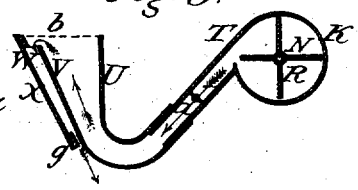

Figure 1 is a perspective representation of my improved middlings-separator; Fig. 2, a longitudinal section of the same; Fig. 3, a section of the drum, fan, and discharge-pipe, showing the bran-sieve or final separating device.

The present invention relates to a new method of separating farinaceous substances from middlings after they come from bolts or bran-dusters of flouring-mills; and its nature consists in the said method and in the novel means used to produce a suction-blast in connection with a series of sieves of different meshes constructed and arranged as follows:

A A represent a substantial frame, which has any convenient form suitable to support the working parts of the separator. K is a fan-case, which is divided by a partition, L, Fig. 2, and in which fans M N are rotated by means of a belt passing over a pulley, O, the shaft R, supporting the fans and pulley, having bearings in the frame A, or in boxes placed above it, as most convenient. The object of the partition L is so to divide the current of air as to give a stronger blast at the lower end of the sieve-case than at its upper end. Three blast-pipes communicate with the interior of the fan-case, as shown at Figs. 1 and 2. The end pipes E E′ are fastened to the ends of the case, and project down nearly to the sieves in the case B, and the center pipe G has branch pipes F F′, which fasten to the pipes E E′, and also communicate with the inside of the fan-case, a partition, *d*, Fig. 2, giving a separate blast to the pipe E. This is done in order that the finer and lighter particles, which do not pass through the first sieve, 8, by being subjected to a light blast of the pipe E, may not all be taken up, but that the remainder will be operated upon by the blast of the pipe G, which is stronger, and then pass under a pipe, E′, which gives the strongest blast. The fine middlings pass through a hopper, Z, and onto a sieve, 9, Fig. 2, and, consequently, receive a lighter blast than the coarser middlings, which pass through a hopper, Y, and onto a sieve, 8. The blast is regulated by means of slides D and dampers H I J. Sieves 1 2 3, &c., are so arranged as to be adjusted in the case B, thereby grading the middlings separated from the bran, accordingly as circumstances may require. This case B is pivoted at its lower end in the usual manner, and is made to oscillate by means of a spring-pitman, P, attached to a standard projecting up from the case, and by a wrist projecting out from the pulley O. Fixed to and projecting outward from the case K is a curved discharge-pipe, T, which is enlarged at its outer end, V U, and covered with wire-cloth, or some porous fabric, *b*, which will allow air to escape, and yet prevent bran or middlings from passing through. This pipe is enlarged, as stated, in order to diminish the force of the outward blast, for the purpose of bringing the substance passing through onto an inclined sieve, W, Fig. 3, and thereby separate what finer particles there may be left in the bran, a back board, X, preventing the finer particles from escaping, except through an opening at *g*, Fig. 3.

It will be seen from this description that the bran and lighter particles are taken up and carried through the spout T U, while the flour and heavy particles pass through the sieves and fall below the case B.

Having thus described my invention, what I claim, and desire to secure by Letters Patent of the United States, is—

1. The method or process of purifying and grading middlings by passing them over reciprocating sieves or sieve-sections of different degrees of fineness, and subjecting them, during their passage, to air-currents of different degrees of strength induced over them by a suction fan or fans, whereby light air-currents are applied to the sieves or sieve-sections containing the lighter and finer particles, and stronger air-currents are applied to the sieves or sieve-sections containing only or mainly the coarser or heavier particles, substantially as described.

2. The combination, with the bolting-surface in a middlings-purifier, of two fans in fan-cases, which do not communicate with each other, each fan operating to produce independent air-currents in separate and distinct compartments, and through different sections of the reciprocating bolting-cloth, substantially as set forth.

3. The combination, in a flour-dressing machine, of a reciprocating shaker clothed with bolting-cloth of different degrees of fineness, transverse air-chambers, arranged above the shaker, and a fan exhausting from each air-chamber, substantially as described.

4. In a middlings-purifier, the combination of a series of sieves of different degrees of fineness with a suction fan or fans for drawing away the light impurities from the meal passing over or from the sieves, and with valves for regulating the strength of the air-currents thus applied to the several sieves, substantially as described.

5. The combination of the case K, provided with a partition, L, and fan M N, with the partition *d*, pipes E G E′ F F′, and case B, provided with sieves 1 2 3 4 5, &c., as set forth.

6. The discharge-pipe T U V, provided with a perforated covering, *b*, back board X, and sieve W, in combination with the case K and fan M N, as described.

JOSEPH BARKER.

Witnesses:
E. A. ELLSWORTH,
A. L. BROWN.